US010531085B2

(12) United States Patent
Liu et al.

(10) Patent No.: US 10,531,085 B2
(45) Date of Patent: Jan. 7, 2020

(54) CODING CHROMA SAMPLES IN VIDEO COMPRESSION

(71) Applicant: Futurewei Technologies, Inc., Plano, TX (US)

(72) Inventors: Shan Liu, San Jose, CA (US); Yin Zhao, Hangzhou (CN)

(73) Assignee: Futurewei Technologies, Inc., Plano, TX (US)

(*) Notice: Subject to any disclaimer, the term of this patent is extended or adjusted under 35 U.S.C. 154(b) by 12 days.

(21) Appl. No.: 15/856,326

(22) Filed: Dec. 28, 2017

(65) Prior Publication Data

US 2018/0332283 A1    Nov. 15, 2018

Related U.S. Application Data

(60) Provisional application No. 62/503,777, filed on May 9, 2017.

(51) Int. Cl.
*H04N 19/11*       (2014.01)
*H04N 19/513*      (2014.01)
(Continued)

(52) U.S. Cl.
CPC .......... *H04N 19/11* (2014.11); *H04N 19/176* (2014.11); *H04N 19/186* (2014.11); *H04N 19/521* (2014.11); *H04N 19/96* (2014.11)

(58) Field of Classification Search
None
See application file for complete search history.

(56) References Cited

U.S. PATENT DOCUMENTS 6,980,596 B2    12/2005  Wang et al.
10,218,973 B2*  2/2019   Hinz ................... H04N 19/105
(Continued)

FOREIGN PATENT DOCUMENTS

CN    104054344 A    9/2014
CN    104380741 A    2/2015
(Continued)

OTHER PUBLICATIONS

Koziri et al., "Implementation of the AVS Video Decoder on a Heterogeneous Dual-Core SIMD Processor, IEEE Transaction on Consumer Electronics", vol. 57, No. 2, May 2011 (Year: 2011).*
(Continued)

*Primary Examiner* — Mohammad J Rahman
(74) *Attorney, Agent, or Firm* — FutureWei Technologies, Inc.

(57) ABSTRACT

A decoder and a method to process chroma blocks by the decoder are described. The method includes receiving a coding block from an encoder; partitioning the coding block into a plurality chroma blocks; merging at least two chroma blocks among the plurality chroma blocks into a merged block, where a width or height of a chroma block among the at least two chroma blocks is less than a threshold, and a width or height of the merged block is no less than the threshold; deriving prediction information for the merged block; generating prediction samples according to the derived prediction information; and obtaining reconstructed chroma samples according to the generated prediction samples. By merging the at least two chroma blocks, whose width or height is less than a threshold, into the merged block, hardware complexity can be reduced.

20 Claims, 7 Drawing Sheets

(51) Int. Cl.
H04N 19/186 (2014.01)
H04N 19/176 (2014.01)
H04N 19/96 (2014.01)

(56) References Cited

U.S. PATENT DOCUMENTS

| | | | | |
|---|---|---|---|---|
| 2012/0294353 A1* | 11/2012 | Fu | .......................... | H04N 19/70 375/240.02 |
| 2013/0136184 A1* | 5/2013 | Suzuki | .................. | H04N 19/52 375/240.16 |
| 2013/0188703 A1* | 7/2013 | Liu | ...................... | H04N 19/503 375/240.12 |
| 2013/0188705 A1* | 7/2013 | Liu | ........................ | H04N 19/50 375/240.12 |
| 2013/0188744 A1* | 7/2013 | Van der Auwera | .......................... | H04N 19/117 375/240.29 |
| 2014/0321529 A1* | 10/2014 | Jung | ...................... | H04N 19/70 375/240.02 |
| 2014/0369616 A1* | 12/2014 | Suzuki | .................. | H04N 19/52 382/233 |
| 2015/0139325 A1* | 5/2015 | Chuang | .................. | H04N 19/51 375/240.16 |
| 2015/0195566 A1* | 7/2015 | Hinz | .................... | H04N 19/105 375/240.13 |
| 2015/0350653 A1* | 12/2015 | Kim | ..................... | H04N 19/137 375/240.02 |
| 2016/0165249 A1 | 6/2016 | Yamamoto et al. | | |
| 2016/0219298 A1* | 7/2016 | Li | ......................... | H04N 19/593 |
| 2016/0323573 A1* | 11/2016 | Ikai | ...................... | H04N 19/597 |
| 2017/0339413 A1* | 11/2017 | Alshin | ................... | H04N 19/50 |
| 2018/0241995 A1* | 8/2018 | Son | ....................... | H04N 19/159 |
| 2019/0045215 A1* | 2/2019 | Chen | ..................... | H04N 19/105 |
| 2019/0260992 A1* | 8/2019 | Jin | ....................... | H04N 19/119 |

FOREIGN PATENT DOCUMENTS

| | | |
|---|---|---|
| CN | 104718759 A | 6/2015 |
| WO | 2017034331 A1 | 3/2017 |

OTHER PUBLICATIONS

Feng Zou et al, View Synthesis Prediction Using Skip and Merge Candidates for HEVC-based 3D Video Coding. 2013 IEEE, pp. 57-60.

Dhruti Patel et al, Review on Intra-prediction in High Efficiency Video Coding (HEVC) Standard. International Journal of Computer Applications, vol. 132—No. 13, Dec. 2015, pp. 27-30.

L.F. Rosario Lucas et al., Efficient Predictive Algorithms for Image Compression, Chapter 2 Prediction Techniques for Image and Video Coding. Springer International Publishing Switzerland 2017, 28 pages.

* cited by examiner

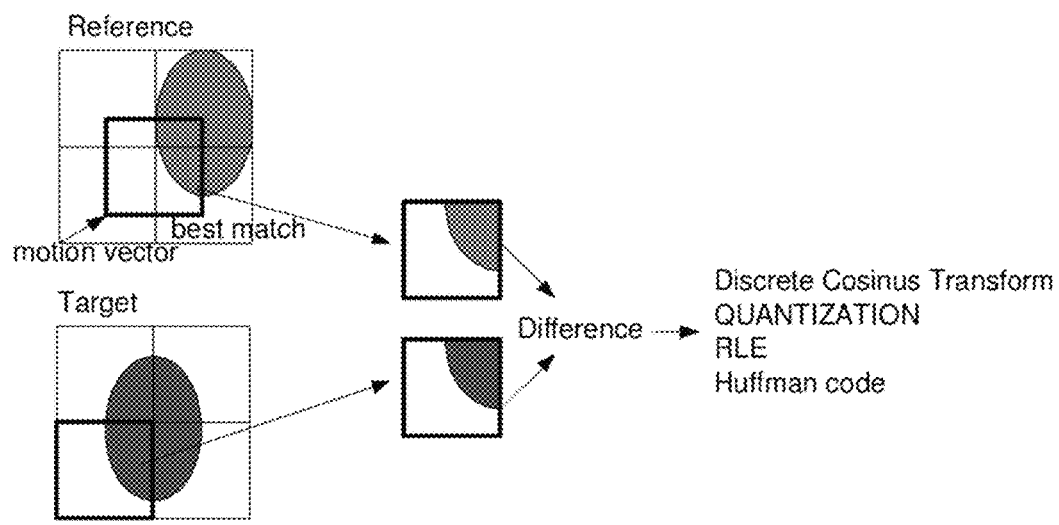
FIG. 3
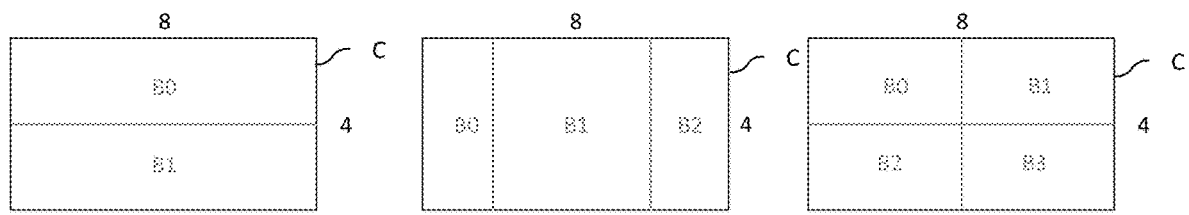
FIG. 4A        FIG. 4B        FIG. 4C

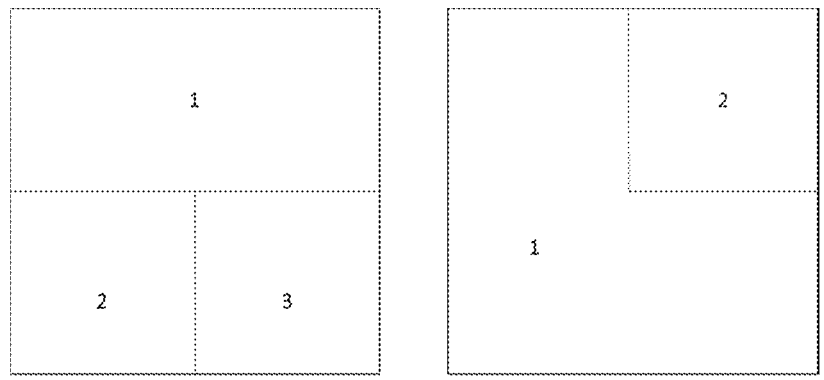
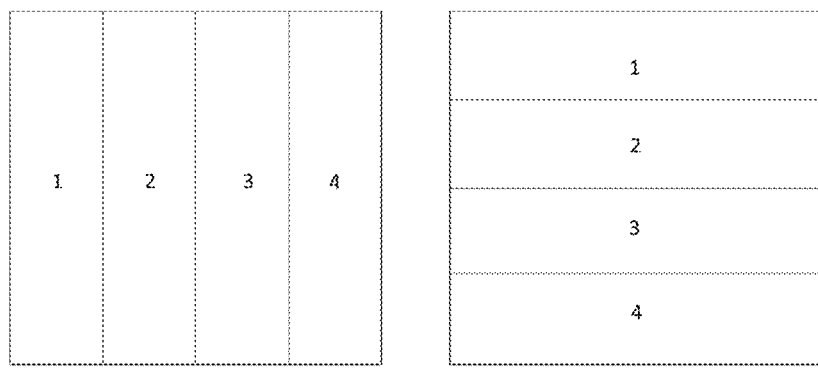
FIGS. 7A-7D

CODING CHROMA SAMPLES IN VIDEO COMPRESSION

CROSS-REFERENCE TO RELATED APPLICATIONS

This application claims the benefit of U.S. Provisional Application No. 62/503,777, filed on May 9, 2017, entitled "Coding Chroma Samples In Video Compression," which is hereby incorporated herein by reference.

TECHNICAL FIELD

The present disclosure relates to the image compression field, and in particular, to devices and methods for coding chroma samples in video compression.

BACKGROUND

In the image compression field, prediction techniques have been widely investigated over the last decades for image and video compression.

A digital video sequence is a temporal succession of digital images, also referred to as pictures or frames, which may present a significant amount of temporal and spatial correlations. An important aspect related to digital images in the color representation. In general, image sensing systems generate color images based on RGB (red, green, and blue) model. One of the main issues of RGB system is the spectral redundancy that may exist between pixels of the three primary color channels. In order to provide a more efficient representation of color images, the YCbCr (luminance, blue chrominance and red chrominance) color system, also known as YUV, has been proposed in ITU-R BT.601 recommendation. The idea of YCbCr system is to concentrate the image spatial information in the luminance (Y) component and use a reduced bandwidth for the chrominance (Cb and Cr) components.

However, as the demand for higher resolutions, more complex graphical content, and faster transmission time increases, so does the need for better video processing methods.

SUMMARY

This disclosure describes devices and methods for coding chrominance samples in video compression. In one embodiment, a predictive decoding method performed by a decoder is provided. The method includes the following steps: receiving a coding block from an encoder; partitioning the coding block into a plurality chroma blocks; merging at least two chroma blocks of the plurality chroma blocks into a merged block, wherein a width or height of one of the at least two chroma blocks is less than a threshold, and a width or height of the merged block is no less than the threshold; deriving prediction information for the merged block; generating prediction samples according to the derived prediction information; and obtaining reconstructed chroma samples according to the generated prediction samples.

In another embodiment, a decoder device, includes a non-transitory memory storage comprising instructions; and one or more processors in communication with the memory. The one or more processors executes the instructions to: receive a coding block from an encoder; partition the coding block into a plurality chroma blocks; merge at least two chroma blocks of the plurality chroma blocks into a merged block, wherein a width or height of one of the at least two chroma blocks is less than a threshold, and a width or height of the merged block is no less than the threshold; derive prediction information for the merged block; generate prediction samples according to the derived prediction information; and obtain reconstructed chroma samples according to the generated prediction samples.

In other embodiments, a video processing system is provided. The video processing system includes an encoder being configured to send a coding block to a decoder; and the decoder being configured to: receive the coding block from the encoder; partition the coding block into a plurality chroma blocks; merge at least two chroma blocks of the plurality chroma blocks into a merged block, wherein a width or height of one of the at least two chroma blocks is less than a threshold, and a width or height of the merged block is no less than the threshold; derive prediction information for the merged block; generate prediction samples according to the derived prediction information; and obtain reconstructed chroma samples according to the generated prediction samples.

In other embodiments, a non-transitory computer-readable medium storing computer instructions, that when executed by one or more processors, cause the one or more processors to: receive a coding block from an encoder; partition the coding block into a plurality chroma blocks; merge at least two chroma blocks of the plurality chroma blocks into a merged block, wherein a width or height of one of at least two chroma blocks is less than a threshold, and a width or height of the merged block is no less than the threshold; derive prediction information for the merged block; generate prediction samples according to the derived prediction information; and obtain reconstructed chroma samples according to the generated prediction samples.

By merging the at least two chroma blocks, whose width or height is less than a threshold, into a merged block, hardware complexity can be reduced.

BRIEF DESCRIPTION OF DRAWINGS

To describe the technical solutions in the embodiments of the present disclosure more clearly, the following briefly describes the accompanying drawings required for describing the embodiments.

FIG. 3 is a schematic diagram illustrating inter prediction;

FIG. 4A is a schematic diagram illustrating sub-blocks are merged into one merged block for prediction according to an embodiment of the present disclosure;

FIG. 4B is a schematic diagram illustrating sub-blocks are merged into one merged block for prediction according to an embodiment of the present disclosure;

FIG. 4C is a schematic diagram illustrating sub-blocks are merged into one merged block for prediction according to an embodiment of the present disclosure;

FIGS. 7A-7D are schematic diagrams illustrating other types of split trees or partitions according to an embodiment of the present disclosure.

DETAILED DESCRIPTION

Figure 1A:
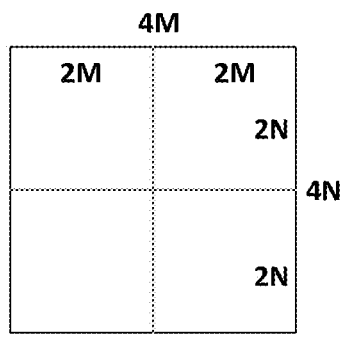
FIG. 1A is a schematic diagram illustrating a quad-tree (QT) split according to an embodiment of the present disclosure.
Figure 1B:
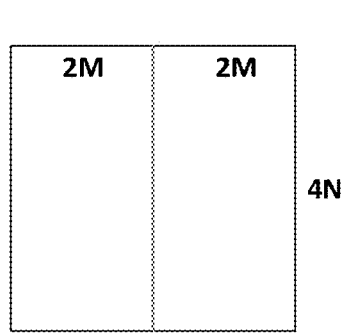
FIG. 1B is a schematic diagram illustrating a binary tree (BT) split in vertical orientation according to an embodiment of the present disclosure.
Figure 1C:
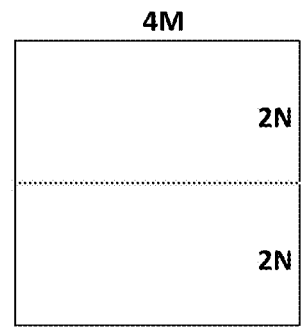
FIG. 1C is a schematic diagram illustrating a binary tree (BT) split in horizontal orientation according to an embodiment of the present disclosure.
Figure 1D:
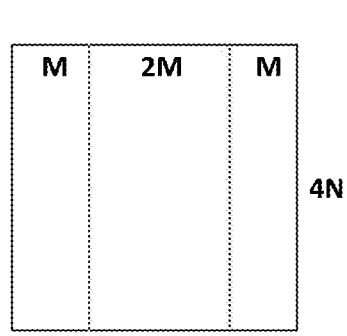
FIG. 1D is a schematic diagram illustrating a triple tree (TT) split in vertical orientation according to an embodiment of the present disclosure.
Figure 1E:
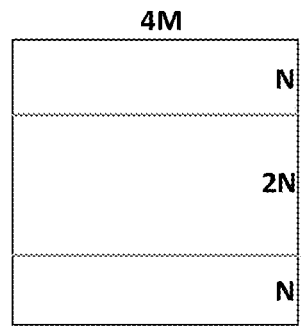
FIG. 1E is a schematic diagram illustrating a triple tree (TT) split in horizontal orientation according to an embodiment of the present disclosure.

The present disclosure relates to video coding. FIGS. 1A-1E illustrate various tree splits. FIG. 1A illustrates a block partitioning structure by adopting a quad-tree (QT) split. The QT is a tree structure for block partitioning in which a node of size 4M×4N may be split into four child nodes of size 2M×2N. FIG. 1B illustrates a block partitioning structure by adopting a binary tree (BT) split in vertical orientation. FIG. 1C illustrates a block partitioning structure by adopting a binary tree (BT) split in horizontal orientation. The BT is a tree structure for block partitioning in which a node of size 4M×4N may either be horizontally split into two child nodes of size 4M×2N or vertically split into two child nodes of size 2M×4N. FIG. 1D illustrates a block partitioning structure by adopting a triple tree (TT) split in vertical orientation. FIG. 1E illustrates block partitioning structure by adopting a triple tree (TT) split in horizontal orientation. The TT is a tree structure for block partitioning in which a node of size 4M×4N may either be horizontally split into three child nodes of size 4M×N, 4M×2N and 4M×N, respectively; or vertically split into three child nodes of size M×4N, 2M×4N and M×4N, respectively. Among the three child nodes shown in FIG. 1D or FIG. 1E, the largest node is positioned in the center.

Quad-tree plus binary tree (QTBT) is a quad-tree plus binary tree structure in which a block is first partitioned using quad-tree split, then each quad-tree child node may be further partitioned using binary tree split. Quad-tree plus binary tree or triple tree (QT-BT/TT) is a quad-tree plus binary tree or triple tree structure in which a block is first partitioned using quad-tree split, then each quad-tree child node may be further partitioned using binary tree or triple tree split.

Figure 2:
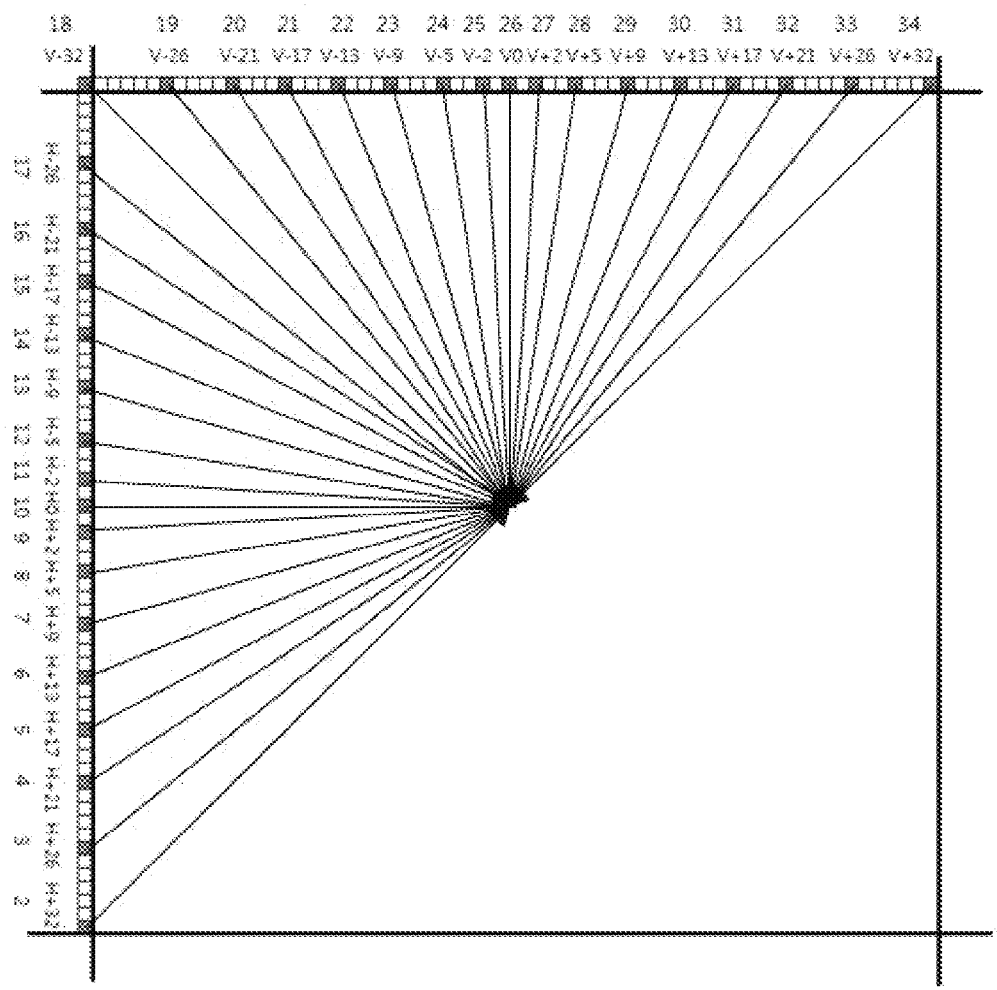
FIG. 2 is a schematic diagram illustrating 33 directional modes for intra prediction.

The intra prediction modes use the previously decoded boundary samples from spatially neighboring blocks in order to predict a new prediction block (PB). The neighboring blocks have been previously decoded from within the same picture. High efficiency video coding (HEVC) specifies 33 directional modes for intra prediction compared with the 8 directional modes for intra prediction specified by H.264/MPEG-4 AVC. The 33 directional modes as shown in FIG. 2, are also called as angular modes. In FIG. 2, the angular modes are indexed from 2 to 34. Directions may cover angles from near-horizontal through near-diagonal to near-vertical. Each mode has associated a displacement parameter d, where the value of d indicates the numeric part which is the pixel's displacement expressed in 1/32 pixel fractions of accuracy, and H and V indicate the horizontal and vertical directionalities. The modes 10 and 26 are known as pure horizontal predication and pure vertical predication, respectively. HEVC also specifies DC intra prediction and planar prediction modes. The DC intra prediction mode generates a mean value by averaging reference samples and can be used for flat surfaces. The DC intra prediction mode is known as mode 1. The planar prediction mode in HEVC supports all block sizes defined in HEVC while the planar prediction mode in H.264/MPEG-4 AVC is limited to a block size of 16×16 pixels. The planar prediction mode is known as mode 0. Therefore, there are total 35 intra prediction modes in HEVC.

Inter prediction is also called as temporal prediction. Temporal prediction with motion compensation is used to remove temporal redundancy between successive pictures. The temporal prediction with motion compensation algorithm may utilize one or two reference pictures to encode a particular picture. A reference picture is a picture that has already been encoded. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm. One of the reference pictures may be in the backward direction in relation to the particular picture that is to be encoded. The other reference picture is in the forward direction in relation to the particular picture that is to be encoded. Reference list 0 may represent at least a past picture reference, and Reference list 1 may represent at least a future picture reference. As shown in FIG. 3, if the encoder succeeds on its search to find a reference block, the block could be encoded by a vector, known as motion vector (MV), which points to the position of the matching block at the reference frame. The process of motion vector determination is called motion estimation. In most cases, the block found is likely not an exact match to the block it is encoding. This is why the encoder will compute the differences between them. Those residual values are known as the prediction error and need to be transformed and sent to the decoder. To sum up, if the encoder succeeds in finding a matching block on a reference frame, it will obtain a motion vector pointing to the matched block and a prediction error. Using both elements, the decoder will be able to recover the raw pixels of the block.

There are three slice types in HEVC. The intra (I) slice for which only intra prediction is allowed. The predictive (P) slice which in addition to intra prediction also allows inter prediction from one reference picture per block using one motion vector and one reference index. This is called uni-prediction. Finally, there is the bi-predictive (B) slice which in addition to intra and uni-prediction also allows inter prediction using two motion vectors and two reference indices. This results in two prediction blocks that are combined to form a final prediction block.

In the YUV color system, a common approach used to achieve reduced bandwidth for the chrominance components is through sub-sampling. Chrominance sub-sampling reduces the spatial resolution of color components. The most common sub-sampling patterns are the 4:2:2 and the 4:2:0. The 4:2:2 pattern uses two Cb and two Cr samples for each group of four luma samples, while the 4:2:0 pattern uses one Cb and one Cr samples for each group of for luma samples. Luma represents luminance, and chroma represents chrominance for description.

For example, when using QT, QTBT or QT-BT/TT partitioning for coding video data in the format of YUV 4:2:0, luma blocks of size 4×2N or 2M×4 can be generated from block partitioning. These luma blocks correspond to chroma blocks of size 2×N or M×2. N=2, $2^2$, $2^3$, . . . , respectively. M=2, $2^2$, $2^3$, . . . , respectively. For reducing hardware complexity, it is desirable that a prediction block (especially an inter-predicted block) has no fewer than 4 pixels along each side, i.e., the width or height of a prediction block is no less than 4 pixels.

The color system exploits the fact that human visual system (HVS) is much more sensitive to luma information than to color information (chroma). The present disclosure presents solutions that may avoid or reduce the occurrence of chroma prediction blocks of size 2×N or M×2, and still can provide a more compact representation of image or video data.

Disclosed herein is a method of coding chroma samples in video compression. After a Coding Tree Unit (CTU) being partitioned into a plurality of chroma blocks, a chroma block B0 of size 2×N or M×2 is merged with at least one neighboring chroma block Bi (i=1,2,3) to form a larger block C for conducting prediction process. The merged block C has no less than 4 pixels along both width and height. Chroma blocks in the merged block C use the same motion vector(s) for inter prediction from the same reference picture(s). In addition, optionally, chroma blocks in the merged block C use the same intra prediction mode to derive intra prediction samples. FIGS. 4A-4C shows three examples for an 8×4 block. If the 8×4 block is split by a horizontal binary tree split or a vertical tree split or a quad-tree split, at least one of the sub-blocks (e.g., B0) has a width <4 or a height <4. These sub-blocks (and subsequent sub-blocks if sub-blocks are further split) are merged into one merged block for prediction. For example, in FIG. 4A, 8×2 block B0, is merged with its neighboring chroma 8×2 block B1 to form the merged block 8×4 C. In FIG. 4B, 2×4 block B0, is merged with its neighboring chroma 4×4 block B1 and 2×4 block B2 to form the merged block 8×4 C. In FIG. 4C, 4×2 block B0, is merged with its neighboring chroma 4×2 block B1, 4×2 block B2, and 4×2 block B3 to form the merged block 8×4 C. A width of a neighboring chroma may be equal, or less or more than a width of the chroma block B0. A height of a neighboring chroma may be equal, or less or more than a height of the chroma block B0.

Figure 5:
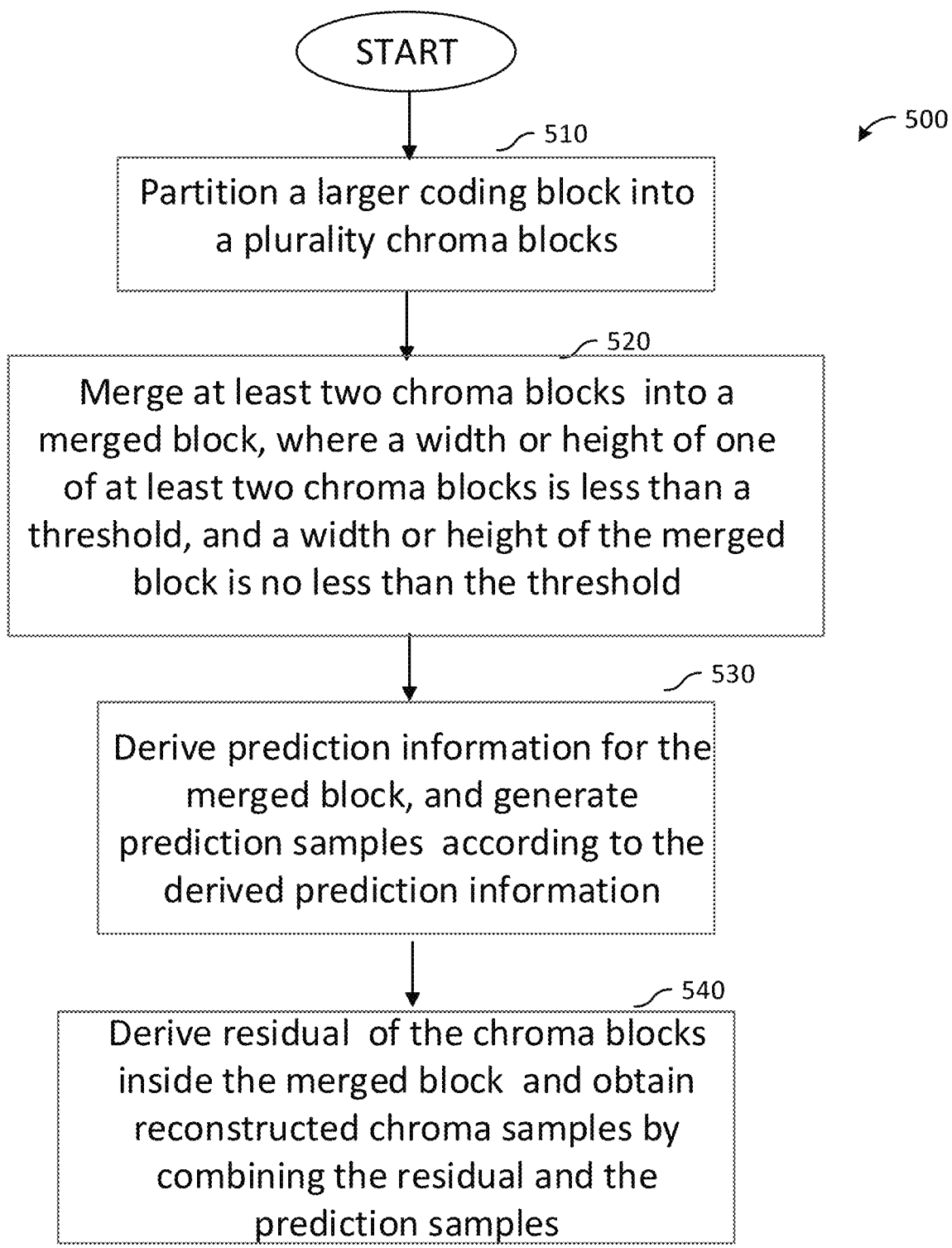
FIG. 5 is a flowchart for merging chroma blocks and obtaining reconstructed chroma samples of the chroma blocks according to an embodiment of the present disclosure.

The present disclosure introduces a method of merging chroma blocks and obtaining reconstructed chroma samples of the chroma blocks, which includes the following four blocks in an embodiment, performed by a decoder, as shown in FIG. 5. Process 500 is an example for the decoder's processing. Similarly, an encoder does the vice versa process.

The decoder receives bit streams (for example, large coding block) from an encoder. Then at block 510, the larger coding block (e.g., coding tree unit (CTU)) is partitioned into a plurality of chroma blocks based on coding tree information, where the coding tree can be QT, QTBT, QTBT/TT or other types for trees and partitions as described in FIG. 1A-1E.

At block 520, at least two chroma blocks whose width or height is less than a threshold (N pixels) are merged into a merged block whose width and height are both no less than the threshold. For example, the threshold (N) is 4. More specifically, the chroma block merging process is as follows. During the partitioning process, if one chroma block is further partitioned into sub-blocks of a width <4 or a height <4, the sub-blocks are merged into one merged block for prediction. For example, as described in FIG. 4A, when a height of B0<4, B0 is merged with B1 into one merged block C for prediction.

At block 530, prediction information of the merged block is derived, and prediction samples are generated according to the derived prediction information. Here, the prediction information includes inter prediction direction, reference frame index and motion vector (MV). The prediction information may also include intra prediction mode. At least one of the processes described in 3.1, 3.2 and 3.3 is applied to derive the prediction information.

3.1 In one embodiment, if the chroma blocks inside the merged block are all inter-predicted blocks, the motion vector(s) and reference frame(s) for the merged block can be derived in one of the following methods described in 3.1.1 and 3.1.2.

3.1.1 Method 1: the motion vector(s) and reference frame(s) for the merged block are copied from those of one target chroma block inside the merged block. For example, the target chroma block may be the first chroma block in coding scan order, the top-left chroma block, the center chroma block, or the largest chroma block (in area or number of pixels contained).

In more details, if the target chroma block uses uni-prediction, the merged block uses uni-prediction, a reference list (for example, reference list 0, or reference list 1), reference frame index and motion vector of the merged block are set to be those of the target chroma block; if the target chroma block uses bi-directional prediction, the merged block uses bi-prediction, and two reference pictures and motion vectors are set as those of the target chroma block. Reference list 0 includes at least a past picture reference, and reference list 1 includes at least a future picture reference.

3.1.2 Method 2: the motion vector(s) and reference frame(s) for the merged block are derived from those of chroma blocks inside the merged block.

As an approach, a reference frame is selected from the reference frames used by all chroma blocks inside the merged block, and is set as the reference frame of the merged block. As an example, the reference frame can be the most frequently used reference frame, i.e., the reference frame that can be referred to by the most of chroma blocks inside the merged block. As another example, the reference frame can also be the first frame in reference list 0. The selected reference frame is associated with one or more motion vectors. Then, the one or more motion vectors associated with the selected reference frame are formed as a MV set, and an average MV or a median MV is derived from the MV set and is determined as a MV of the merged block. The merged block uses uni-prediction with the derived MV and reference frame.

As another approach, two reference frames are chosen from the reference frames used by all chroma blocks inside the merged block. As an example, the two reference frames can be the two most frequently used reference frames. As another example, the first reference frame may be in reference list 0 and 1, or the first two frames of reference list 0. Then, all motion vectors of the chroma blocks are first scaled to the two reference frames, forming a MV set for each of the two reference frames. An average MV or a median MV is derived for each MV set. The merged block uses bi-prediction with the derived two MVs and reference frames. It should be noted that the merged block uses uni-prediction and only one MV set is formed if the two most frequently used reference frames are the same frame. The MV scaling is commonly used to convert a motion vector between two frames of Picture Order Count (POC) difference A to another vector between two frames of POC difference B, such as that in the H.265 standard.

3.2 If the chroma blocks inside the merged block are all intra-predicted blocks, an intra prediction mode used by one of the chroma blocks is identified and used as an intra prediction mode for the merged block. For example, an intra prediction mode is parsed at the first intra-predicted chroma block in coding scan order inside the merged block, and all chroma blocks in the merged block use this intra prediction mode to generate intra prediction samples. The intra prediction modes of the rest chroma blocks in the merged block are not signaled in the bit streams. Here, an intra prediction mode may be one of the DC mode, Planar mode and a set of angular prediction modes.

3.3 If the chroma blocks inside the merged block include intra-predicted blocks and inter-predicted blocks, in one method, the merged block is inter-predicted based on the inter prediction information of the first inter-predicted chroma block in coding order inside the merged block, where the inter prediction information includes inter prediction direction, motion vector(s) and reference frame(s). In another method, a prediction mode for a largest block which contains most number of pixels inside the merged block is identified and used as the prediction mode of the merged block. If there are more than one largest block in same size, one of them is used, generally the first one in coding scan order. In yet another method, a prediction mode for a first block in coding scan order inside the merged block is identified and used as the prediction mode of the merged block. If the merged block is decided to be inter predicted, and if there are more than one inter block among the blocks which form the merged block, methods described in clause 3.1 may be used to derive the motion information of the merged block. If the merged block is decided to be intra predicted, and if there are more than one intra block among the blocks which form the merged block, methods descried in clause 3.2 may be used to derive the intra prediction information of the merged block.

At block 540, a residual of each chroma block inside merged block is derived by de-quantizing and inverse transform of the transform coefficients of each chroma block (if the transform coefficients are present), and reconstructed chroma samples are obtained by combining the residuals and the prediction samples generated at block 530. The residual is associated with a transform block. If the transform coefficients are not present, the residual of the corresponding chroma block is zero.

Figure 6:
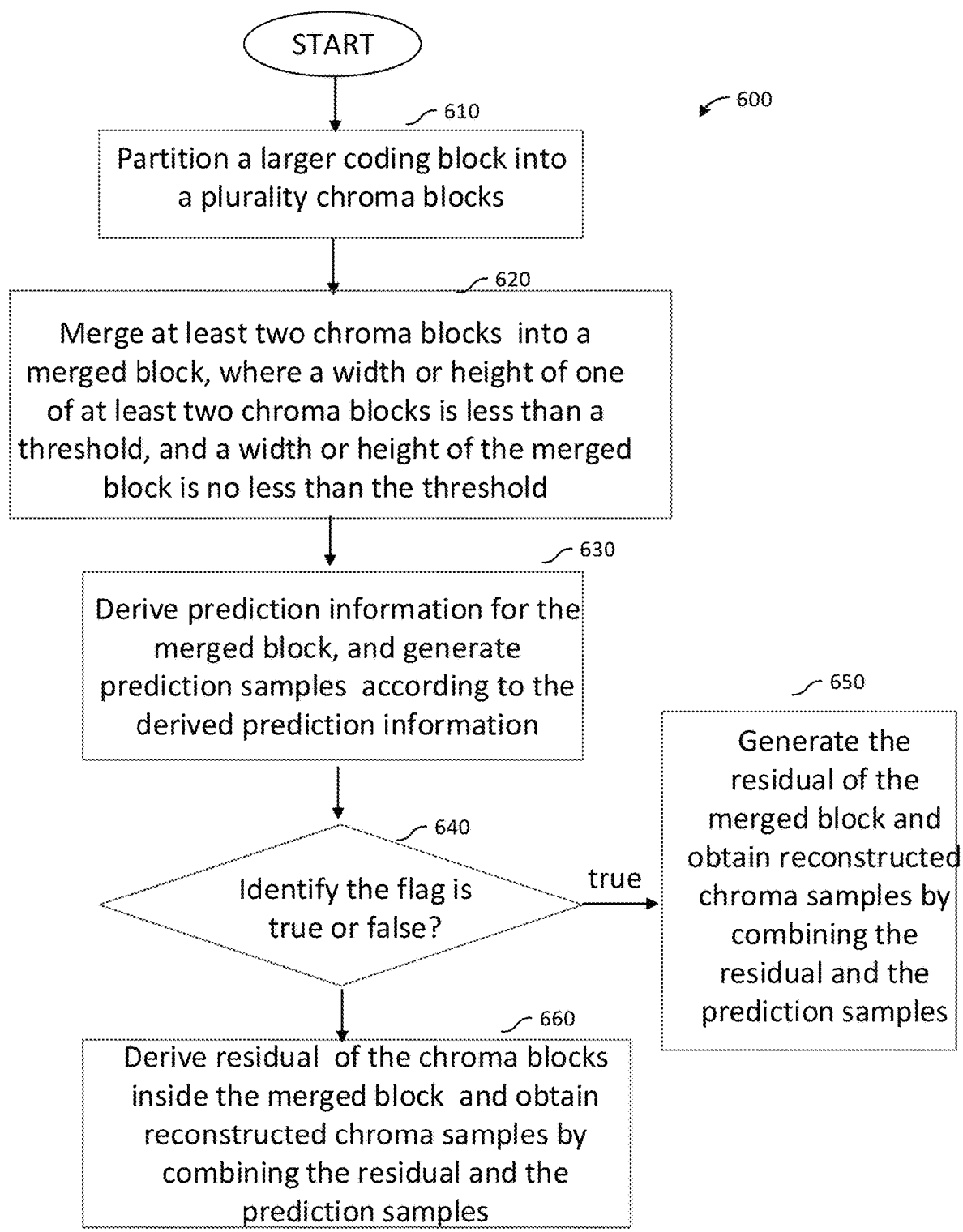
FIG. 6 is a flowchart for merging chroma blocks and obtaining reconstructed chroma samples of the chroma blocks according to an embodiment of the present disclosure.

The present disclosure introduces a method of merging chroma blocks and obtaining reconstructed chroma samples of the chroma blocks, which includes the following six blocks in another embodiment, performed by a decoder, as shown in FIG. 6. Process 600 is an example for the decoder's processing. Similarly, an encoder does the vice versa process.

Block 610 to block 630, similar as that in block 510 to block 530 in process 500, show how the prediction samples of the merged block are generated. At block 640, a flag is parsed from the bit streams. The flag is a term in video coding, which may refer to a syntax element with two possible values (for example, 0 and 1). The decoder identified the flag is true or false. If this flag is true, the residuals of all the chroma blocks inside the merged block are grouped as one transform block having a same size to the merged block. Each residual is associated with a smaller transform block. Transform coefficients of the transform block are parsed, de-quantized and then inversely transformed to generate the residual of the merged block. The reconstructed chroma samples are obtained by combining the residual and the prediction samples at block 650. If this flag is false, at block 660, the residual of the chroma blocks inside the merged block is derived by de-quantization and inverse transform of the transform coefficients of each chroma block (if the transform coefficients of the chroma block are present in the bit streams). Reconstructed chroma samples are obtained by combining the residual and the prediction samples generated at block 630.

As an example, N=4 (N is the threshold mentioned in above block 520 or block 620) is used in the present disclosure for illustration. However all methods presented in the present disclosure may be applied to platforms which require N to be other positive integer numbers (e.g., 8, 2 or 16.)

It is also noted that QT, TT and BT are types of trees used in the present disclosure for illustration. The methods described in the present disclosure can be applied to other types of split trees or partitions. Some are shown in FIGS. 7A-7D.

It is also noted that the methods presented in the present disclosure apply to chroma blocks with one or more than one side less than N (e.g. N=4) due to YUV422 subsampling; or any coded sample blocks (luma or chroma) with one or more than one side less than N (e.g. N=4.)

The existing solutions (i.e., QTBT and QT-BT/TT) may generate chroma prediction blocks of a width <4 or a height <4. The present disclosure mitigates the problem by combining multiple chroma blocks to form a larger prediction block which has at least 4 pixels along each side.

Quad-tree is a key feature of International Telecommunication Union (ITU) Telecommunication Standardization Sector (ITU-T) H.265 video coding standard (most recently dated December 2016), which is incorporated herein by reference. Intra prediction, inter prediction, de-quantization, inverse transform and parsing of syntax are basic processing of video coding, and additional details are found in the H.265 video coding standard.

QTBT was introduced in J. An, Y.-W. Chen, K. Zhang, H. Huang, Y.-W. Huang, and S. Lei, "Block partitioning structure for next generation video coding," ITU-T SG16 Doc. COM16-C966, September 2015, which is incorporated herein by reference.

QT-BT/TT was introduced in X. Li et al., Multi-Type-Tree, JVET-D0117, October 2016, which is incorporated herein by reference.

Figure 8:
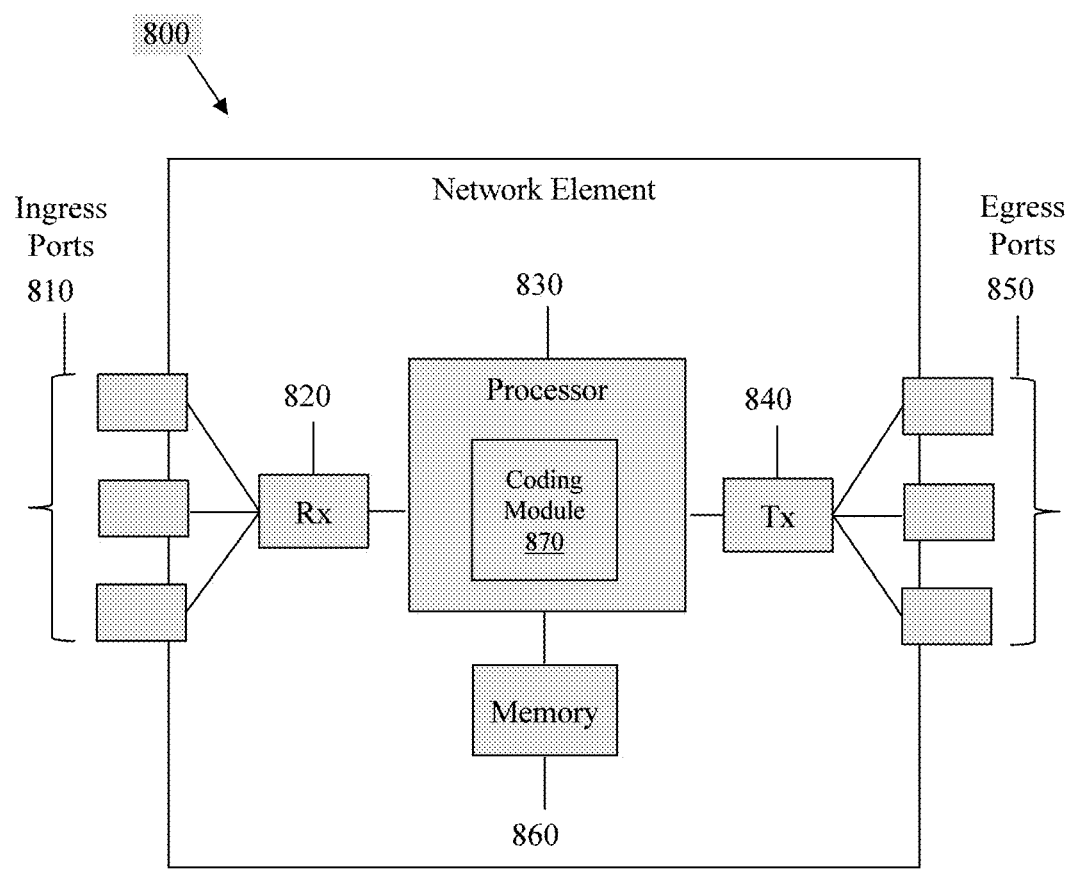
FIG. 8 is a block diagram of a network element 800 that can be used to implement various embodiments.

FIG. 8 is a schematic diagram of a network element 800 according to an embodiment of the disclosure. The network element 800 may be the encoder or the decoder for implementing the disclosed embodiments as described herein. The network element 800 comprises ingress ports 810 and receiver units (Rx) 820 for receiving data; a processor, logic unit, or central processing unit (CPU) 830 to process the data; transmitter units (Tx) 840 and egress ports 850 for transmitting the data; and a memory 860 for storing the data. The network element 800 may also comprise optical-to-electrical (OE) components and electrical-to-optical (EO) components coupled to the ingress ports 810, the receiver units 820, the transmitter units 840, and the egress ports 850 for egress or ingress of optical or electrical signals.

The processor 830 is implemented by hardware and software. The processor 830 may be implemented as one or more CPU chips, cores (e.g., as a multi-core processor), field-programmable gate arrays (FPGAs), application specific integrated circuits (ASICs), and digital signal processors (DSPs). The processor 830 is in communication with the ingress ports 810, receiver units 820, transmitter units 840, egress ports 850, and memory 860. The processor 830 comprises a coding module 870. The coding module 870 implements the disclosed embodiments described above. For instance, the coding module 870 implements the methods of coding chroma blocks and obtaining reconstructed chroma samples of the chroma blocks. The inclusion of the coding module 870 therefore provides a substantial improvement to the functionality of the network element 800 and effects a transformation of the network element 800 to a different state. Alternatively, the coding module 870 is implemented as instructions stored in the memory 860 and executed by the processor 830.

The memory 860 comprises one or more disks, tape drives, and solid-state drives and may be used as an overflow data storage device, to store programs when such programs are selected for execution, and to store instructions and data that are read during program execution. The memory 860 may be volatile and/or non-volatile and may be read-only memory (ROM), random-access memory (RAM), ternary content-addressable memory (TCAM), and/or static random-access memory (SRAM).

By merging at least two chroma blocks to avoid or reduce the occurrence of chrominance prediction blocks of size 2×N or M×2, whose width or height is less than a threshold, into a merged block, hardware complexity can be reduced.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing chroma blocks by a decoder, comprising:
   receiving a coding block from an encoder;
   partitioning the coding block into a plurality of chroma blocks;
   merging at least two chroma blocks of the plurality of chroma blocks into a merged block, wherein a width or height of one of at least two chroma blocks is less than a threshold, and a width or height of the merged block is no less than the threshold;
   deriving prediction information for the merged block;
   generating prediction samples according to the derived prediction information;
   generating a residual of the merged block according to transform coefficients of the at least two chroma blocks inside the merged block; and
   obtaining reconstructed chroma samples according to the generated prediction samples and the residual of the merged block.

2. The method of claim 1, wherein the prediction information comprises a motion vector and a reference frame for the merged block, and wherein the deriving prediction information comprises:
   copying, a motion vector and a reference frame used by one of the at least two chroma blocks, as the motion vector and the reference frame for the merged block.

3. The method of claim 1, wherein the prediction information comprises a motion vector and a reference frame for the merged block, and wherein the deriving prediction information comprises:
   selecting the reference frame for the merged block from reference frames used by the at least two chroma blocks inside the merged block, wherein the reference frame is associated with one or more motion vectors; and
   determining the motion vector for the merged block, based on the one or more motion vectors associated with the reference frame.

4. The method of claim 1, wherein the prediction information comprises an intra prediction mode for the merged block, and wherein the deriving prediction information comprises:
   identifying an intra prediction mode used by one of the at least two chroma blocks; and
   using the intra prediction mode as an intra prediction mode for the merged block.

5. The method of claim 1, wherein the at least two chroma blocks inside the merged block include an intra-predicted block and an inter-predicted blocks, and wherein the deriving prediction information comprises:
   identifying a prediction mode for a largest block which contains most number of pixels inside the merged block; and
   using the prediction mode for the largest block as a prediction mode for the merged block.

6. The method of claim 1, wherein the at least two chroma blocks inside the merged block include an intra-predicted block and an inter-predicted blocks, and wherein the deriving prediction information comprises:
   identifying a prediction mode for a first block in coding scan order inside the merged block; and
   using the prediction mode for the first block as a prediction mode for the merged block.

7. The method of claim 1, wherein the generating the residual of the merged block according to the transform coefficients of the at least two chroma blocks inside the merged block comprises:
   grouping, residuals of the at least two chroma blocks inside the merged block as one transform block having a same size to the merged block; and
   generate the residual of the merged block according to transform coefficients of the transform block.

8. A decoder device, comprising:
   a non-transitory memory storage comprising instructions; and
   one or more processors in communication with the memory, wherein the one or more processors executes the instructions to:
   receive a coding block from an encoder;
   partition the coding block into a plurality chroma blocks;
   merge at least two chroma blocks of the plurality chroma blocks into a merged block, wherein a width or height one of the at least two chroma blocks is less than a threshold, and a width or height of the merged block is no less than the threshold;
derive prediction information for the merged block;
generate prediction samples according to the derived prediction information;
generate a residual of the merged block according to transform coefficients of the at least two chroma blocks inside the merged block; and
obtain reconstructed chroma samples according to the generated prediction samples and the residual of the merged block.

9. The device of claim 8, wherein the prediction information includes a motion vector and a reference frame for the merged block, and wherein the one or more processors executes the instructions to:
copy, a motion vector and a reference frame used by one of the at least two chroma blocks, as the motion vector and the reference frame for the merged block.

10. The device of claim 8, wherein the prediction information comprises a motion vector and a reference frame for the merged block, and wherein the one or more processors executes the instructions to:
select the reference frame for the merged block from reference frames used by the at least two chroma blocks inside the merged block, wherein the reference frame is associated with one or more motion vectors; and
determine the motion vector for the merged block, based on the one or more motion vectors associated with the reference frame.

11. The device of claim 8, wherein the prediction information comprises an intra prediction mode for the merged block, and wherein the one or more processors executes the instructions to:
identify an intra prediction mode used by one of the at least two chroma blocks; and
use the intra prediction mode as an intra prediction mode for the merged block.

12. The device of claim 8, wherein the one or more processors executes the instructions to:
group residuals of the at least two chroma blocks inside the merged block as one transform block having a same size to the merged block;
generate the residual of the merged block according to transform coefficients of the transform block.

13. A non-transitory computer-readable medium storing computer instructions, that when executed by one or more processors, cause the one or more processors to:
receive a coding block from an encoder;
partition the coding block into a plurality chroma blocks;
merge at least two chroma blocks of the plurality chroma blocks into a merged block, wherein a width or height of one of at least two chroma blocks is less than a threshold, and a width or height of the merged block is no less than the threshold;
derive prediction information for the merged block;
generate prediction samples according to the derived prediction information;
generate a residual of the merged block according to transform coefficients of the at least two chroma blocks inside the merged block; and
obtain reconstructed chroma samples according to the generated prediction samples and the residual of the merged block.

14. The non-transitory computer-readable medium of claim 13, wherein the prediction information includes a motion vector and a reference frame for the merged block, and wherein the computer instructions, that when executed by one or more processors, cause the one or more processors to:
copy, a motion vector and a reference frame used by one of the at least two chroma blocks, as the motion vector and the reference frame for the merged block.

15. The non-transitory computer-readable medium of claim 13, wherein the prediction information comprises a motion vector and a reference frame for the merged block, and wherein the computer instructions, that when executed by one or more processors, cause the one or more processors to:
select the reference frame for the merged block from reference frames used by the at least two chroma blocks inside the merged block, wherein the reference frame is associated with one or more motion vectors; and
determine the motion vector for the merged block, based on the one or more motion vectors associated with the reference frame.

16. The non-transitory computer-readable medium of claim 13, wherein the prediction information comprises an intra prediction mode for the merged block, and wherein the computer instructions, that when executed by one or more processors, cause the one or more processors to:
identify an intra prediction mode used by one of the at least two chroma blocks; and
use the intra prediction mode as an intra prediction mode for the merged block.

17. The non-transitory computer-readable medium of claim 13, wherein the computer instructions, that when executed by one or more processors, cause the one or more processors to:
group residuals of the at least two chroma blocks inside the merged block as one transform block having a same size to the merged block;
generate the residual of the merged block according to transform coefficients of the transform block.

18. The device of claim 8, wherein the at least two chroma blocks inside the merged block include an intra-predicted block and an inter-predicted block, and wherein the one or more processors executes the instructions to:
identify a prediction mode for a largest block that contains most number of pixels inside the merged block; and
set the prediction mode for the largest block as a prediction mode for the merged block.

19. The device of claim 8, wherein the at least two chroma blocks inside the merged block include an intra-predicted block and an inter-predicted block, and wherein the one or more processors executes the instructions to:
identify a prediction mode for a first block in coding scan order inside the merged block; and
set the prediction mode for the first block as a prediction mode for the merged block.

20. The non-transitory computer-readable medium of claim 13, wherein the at least two chroma blocks inside the merged block include an intra-predicted block and an inter-predicted block, and wherein the computer instructions, that when executed by the one or more processors, cause the one or more processors to:
identify a prediction mode for a largest block which contains most number of pixels inside the merged block; and
set the prediction mode for the largest block as a prediction mode for the merged block.

* * * * *